(No Model.)
F. E. BAILEY
OIL PURIFIER.
No. 536,367. Patented Mar. 26, 1895.
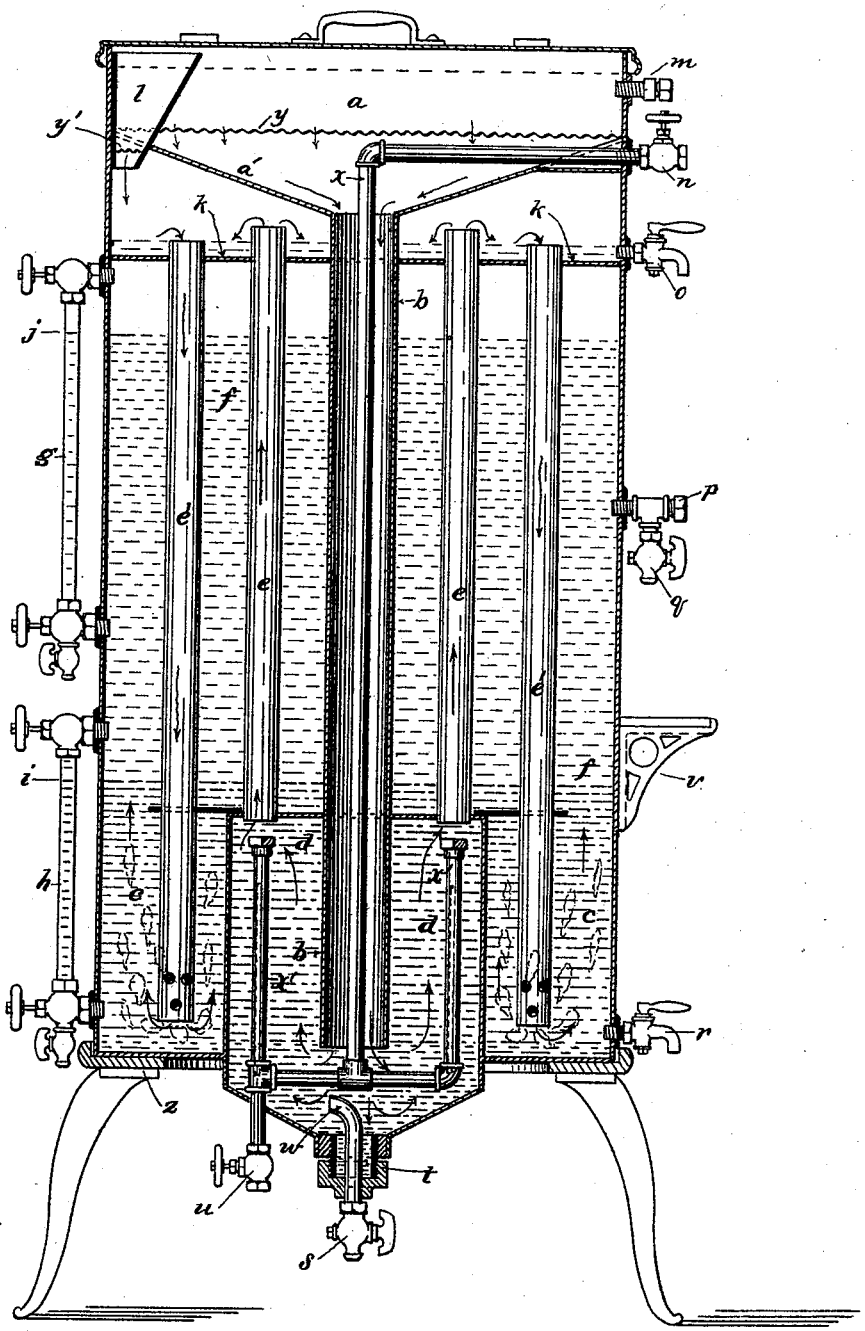
Witnesses.
G. Bacon Price
W. B. Wright
Inventor.
Frank Eugene Bailey

UNITED STATES PATENT OFFICE.

FRANK EUGENE BAILEY, OF PHILADELPHIA, PENNSYLVANIA.

OIL-PURIFIER.

SPECIFICATION forming part of Letters Patent No. 536,367, dated March 26, 1895.

Application filed November 8, 1894. Serial No. 528,202. (No model.)

*To all whom it may concern:*

Be it known that I, FRANK EUGENE BAILEY, a citizen of the United States, residing at Philadelphia, in the county of Philadelphia and State of Pennsylvania, have invented a new and useful Improvement in Oil-Purifiers, of which the following is a specification.

My invention relates to improvements in oil purifiers, of that class, especially, designed to reclaim waste oil by cleansing it of sediment and other impurities. It also furnishes, incidentally, a receptacle and cleanser of new oil, as well. It is adapted to all uses of oil which is fed on the bearings of engines and other machinery and is then collected in drip pans or other devices, from which it can be conveyed to the oil purifier and being there cleansed of residue matter, made fit for further use as before.

The operation of feeding, collecting, purifying and again returning the oil to bearings may be made automatic by the "continuous return system" of oiling machinery, in conjunction with this purifier. This system applies particularly, and with much saving of labor,— to such establishments as electric light plants, railway stations, power stations, breweries, ice, and refrigerating plants and mills, where large machinery is employed; doing away with oil cups on the bearings; the oil being conducted from the purifier, through suitable main pipes and branches to each bearing, from which it drips into suitable receptacles leading into a return system of pipes in connection with a suction pump by which it is returned into the purifier for filtration.

I will now describe the process by which the oil is filtered or cleansed of impurities in my purifier; reference being made to parts of same by letters on the accompanying drawing which shows a vertical section through the center.

The body of the purifier is, by preference, cylindrical, made, usually, of sheet iron. The upper compartment $a$ has a sloping bottom $a'$ out of and down from which leads the centrally attached pipe $b$. Above this sloping bottom is a fine mesh screen or sieve $y$; while just below this sloping bottom is a partition head $k$ into which are fastened the slightly projecting upper ends of pipes $e$, $e$, $e'$, $e'$. The lower ends of pipes $e$, $e$, fasten through the upper head of chamber $d$. The lower ends of pipes $e'$, $e'$, which are perforated, hang free just above the bottom head of purifier. The dirty oil which is to be purified is poured in upon the sieve $y$, which intercepts any straws, sticks, or waste, and passing through runs down the sloping head $a'$ into the large vertical pipe $b$, emerging thence into the lower chamber $d$. Within this pipe $b$ and chamber $d$ it comes into contact with the steam heating pipes $x$, $x'$, whose inlet connection is at valve $n$ and outlet at valve $u$. The effect of this contact is to limber up or thin out the oil by separating its molecules and causing any heavier suspended residue matter to be precipitated to the bottom of lower settling chamber $d$, from which point said residue matter can be taken out by removing the reducer head $t$. The oil, now thinned and lightened by parting with its residue, and pressed upon by the column of heavier oil in pipe $b$, is forced up the pipes $e$, $e$, and overflows at the top ends upon the upper partition head $k$—(this forming an upper settling chamber)—where it spreads out, and partly cooling, allows a further settling. The surface of this thin layer of oil, mounting over the upper ends of pipes $e'$, $e'$, descends thereby and discharges at the lower ends and through the perforations in pipes $e'$, $e'$, by which it is divided into small particles, enabling it to be more thoroughly washed in its passage upward, from this point, through the water in space $c$. The oil, is filtered and cooled, gradually accumulates above the water line $i$, and may be drawn off for use, as needed, through the cock $q$.

If the "continuous return system" of lubrication is to be used, the main supply pipe thereof will be connected to purifier at $p$, and the return from pumps at $m$. When new oil is added to that already in the purifier, it is introduced through the funnel $l$, which is provided with a fine mesh sieve or strainer $y'$, and falling upon the partition head $k$ follows the same course as the purifying oil from this point. The cock $o$ is to draw off the thin layer of sediment or oil, as required, from partition head $k$; the cock $r$ to empty the vessel of water, and cock $s$ to draw off any remaining oil through small bent pipe $w$, before removing the reducer head $t$ for final cleaning.

The glass gages $h$ and $g$ are to denote the height, respectively, of the water and oil in tank.

The steam connection at valve $n$ may be to either live or exhaust steam.

I am aware that, prior to my invention, oil purifiers, having water therein and using heat as a purifying medium, were in use. I do not claim originality in this; but What I do claim as my invention, and desire to secure by Letters Patent, is—

1. In an oil filter, the combination with an outer shell or casing an upper compartment $a$, a centrally inclined bottom to said compartment, a screen $y$ placed over said inclined bottom, a lower compartment $d$, a vertical pipe $b$ connecting said compartments, a horizontal partition $k$ below said bottom $a'$ forming a settling chamber, a filtering compartment $f$ below said partition, vertical pipes $e$ connecting compartment $d$ with said settling chamber, pipes $e'$ suspended in said partition $k$ and forming outlets from said settling chamber into said filtering chamber extending to a point adjacent to the bottom of said filtering chamber, an inlet $m$ to said compartment $a$, and outlet $p$ from said chamber $f$ and an outlet waste pipe $w$ from said chamber $d$, substantially as described.

2. In an oil filter an outer shell or casing, an upper compartment $a$, a centrally inclined bottom $a'$, screen $y$ placed over said inclined bottom a lower cylindrical compartment $d$, a vertical pipe $b$ leading from said upper compartment to said lower compartment, a horizontal partition $k$ below said inclined bottom $a'$ forming a settling chamber, a filtering compartment $f$ below said partition, vertical pipes $e$ connecting said compartments $d$ and said settling chamber, vertical pipes $e'$ forming outlets from said settling compartment into said compartment $c$ and extending to a point adjacent to the bottom of said compartment $f$, perforations surrounding the bottom of said pipes $e'$ steam pipes $x$, $x'$ entering compartments $a$, a funnel $l$ establishing communication between compartments $a$ and $k$, a screen $y'$ in said funnel, an inlet connection to said chamber $a$, an outlet connection from said chamber $f$ and a waste outlet from chamber $d$, substantially as described.

FRANK EUGENE BAILEY.

Witnesses:
G. BACON PRICE,
W. B. WRIGHT.